Figure 1:
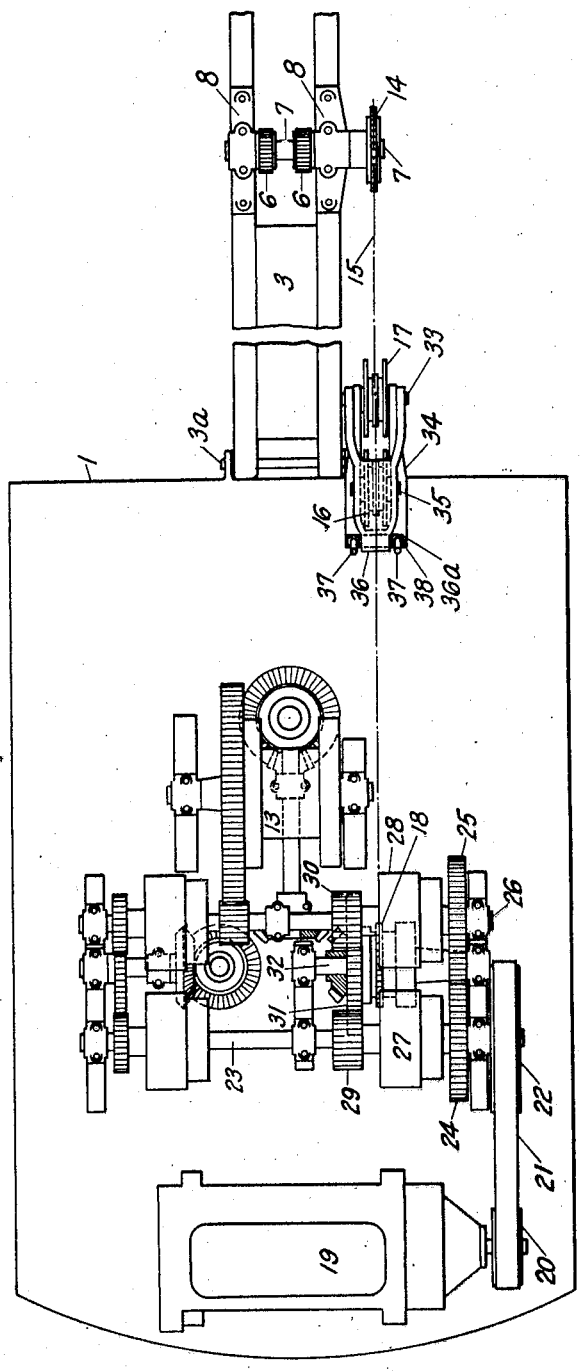

March 30, 1926.

E. J. ARMSTRONG

POWER SHOVEL

Filed April 5, 1924

1,578,702

2 Sheets-Sheet 1

Inventor
Edwin J. Armstrong
By
Attorney

March 30, 1926.
E. J. ARMSTRONG
POWER SHOVEL
Filed April 5, 1924
1,578,702
2 Sheets-Sheet 2
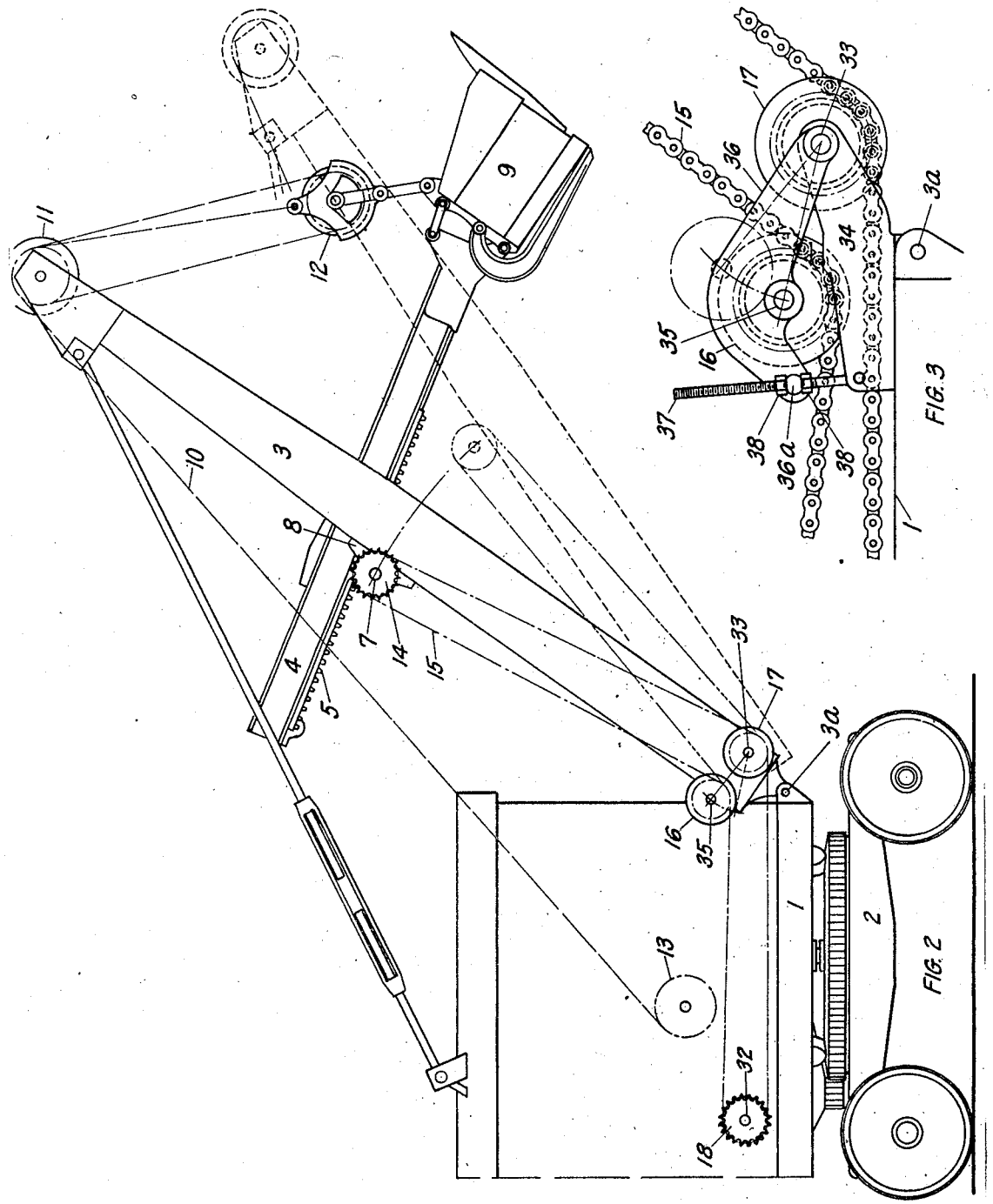

Patented Mar. 30, 1926.

1,578,702

UNITED STATES PATENT OFFICE.

EDWIN J. ARMSTRONG, OF ERIE, PENNSYLVANIA, ASSIGNOR TO ERIE STEAM SHOVEL COMPANY, OF ERIE, PENNSYLVANIA, A CORPORATION OF PENNSYLVANIA.

POWER SHOVEL.

Application filed April 5, 1924. Serial No. 704,415.

*To all whom it may concern:*

Be it known that I, EDWIN J. ARMSTRONG, a citizen of the United States, residing in the city of Erie, county of Erie, and State of Pennsylvania, have invented new and useful Improvements in Power Shovels, of which the following is a specification.

In handling power shovels, particularly those driven from a motor mounted on the platform difficulty has been experienced in driving the shipper shaft controlling the crowding of the dipper. Several expedients have been tried carrying the power from the platform to the shaft. Difficulty has been experienced in providing a mechanism which would permit of the adjustment of the boom on which the shipper shaft is usually mounted without adjusting the driving connection. The present invention is designed to permit of the use of a driving chain for conveying the movement from the power on the platform to the shipper shaft and guiding the same so as to permit of the swinging of the boom without the attention, or adjustment of the guiding means of the chain. Features and details of the invention will appear from the specification and claims.

The invention is illustrated in the accompanying drawings as follows:—

Fig. 1 shows a plan view of a shovel.
Fig. 2 a side elevation of the same.
Fig. 3 an enlarged view of the chain guiding means.

1 marks the shovel platform, 2 the truck on which it is mounted, 3 the shovel boom, this being pivoted at 3ª on the platform, 4 the dipper stick, 5 the rack on the dipper stick, 6 gears on the shipper shaft 7 engaging the rack, and 8 bearings on the boom in which the shaft 7 is journaled. A dipper 9 is arranged on the stick. A hoisting line 10 runs over a sheave 11 and through a sheave 12 on the dipper and is driven from a drum 13 on the platform in the usual manner.

A sprocket 14 is fixed on the shipper shaft 7 and a chain 15 runs around guiding sheaves 16 and 17 and is driven from a sprocket 18 on the platform.

A motor 19 is mounted on the platform. It has a power pulley 20. A belt 21 conveys power from the pulley 20 to a pulley 22. A reversing device for handling the dipper is provided.

The pulley 22 is fixed on a shaft 23. A gear 24 is fixed on the shaft 23 and meshes with a gear 25. The gear 25 is fixed on a shaft 26. Fluid actuated clutches 27 and 28 are mounted on the shafts 23 and 26 and lock gears 29 and 30 respectively with the shafts 23 and 26. The gears 29 and 30 mesh with a gear 31 fixed on a shaft 32. The sprocket 18 is fixed on the shaft 32. By throwing the clutches the gear 31 may be driven in either direction and thus the chain may be reversed as desired in handling the dipper.

The sheave 17 is mounted on a shaft 33 and the shaft 33 is mounted in a bracket 34, the bracket 34 being secured to the platform 1 adjacent to the pivot 3ª, or bottom of the boom. The sheave 16 is mounted on a shaft 35 and the shaft 35 is carried by an arm 36 pivotally mounted on the shaft 33. Screws 37 are secured to the bracket 34 and extend through a pin 36ª in the arm 36 and nuts 38 are provided on the screws by means of which the arm may be adjusted, thus swinging the sheave 16 to tighten or loosen the chain.

The problem is to take care of the double reaches of the chain with a guide sheave which is so arranged with relation to the pivot 3ª and the sprocket 14 that the swinging of the boom will not change the tension on the chain sufficiently to interfere with its operation. It will be noted that the line between the axes of the sheaves crosses a line between the pivot 3ª and the axis of the sprocket 14 and that as the boom is swung the sprocket 14 may turn allowing the chain to roll over it so that with the two fixed points at the sheaves 16 and 17 the chain will be relieved in the two reaches taking up in one reach and playing out in the other as the boom is swung. The variations within the limits of the swinging of the boom are very minute, easily within the working requirements of the chain.

The adjustment of the sheave 16 is along the line of the reach between that sheave and the sprocket 14 and consequently does not change materially the relation of the parts.

What I claim as new is:—

1. In a excavating machine, the combination of a platform; a boom pivotally mounted on the platform; a shaft mounted on the boom; an excavating device actuated by the shaft; a driven sprocket fixed on the shaft; a motor on the platform; a driving sprocket driven by the motor; a chain connecting the driving and driven sprockets; and guide sheaves for each reach of the chain adjacent to the pivot of the boom, said sheaves being positioned relatively to the pivoted boom to retain an approximately constant tension on the chain as the boom is swung.

2. In an excavating machine, the combination of a platform; a boom pivotally mounted on the platform; a shaft mounted on the boom; an excavating device actuated by the shaft; a driven sprocket fixed on the shaft; a motor on the platform; a driving sprocket driven by the motor; a chain connecting the driving and driven sprockets; guide sheaves for each reach of the chain mounted on the platform adjacent to the pivot of the boom, said sheaves being positioned relatively to the pivoted boom to retain an approximately constant tension on the chain as the boom is swung.

3. In an excavating machine, the combination of a platform; a boom pivotally mounted on the platform; a shaft mounted on the boom; an excavating device actuated by the shaft; a driven sprocket fixed on the shaft; a motor on the platform; a driving sprocket driven by the motor; a chain connecting the driving and driven sprockets; guide sheaves for each reach of the chain adjacent to the pivot of the boom, said sheaves being positioned with a line connecting the axes of the sheaves crossing a line from the pivot of the boom to the axis of the driven sprocket.

4. In an excavating machine, the combination of a platform; a boom pivotally mounted on the platform; a shaft mounted on the boom; an excavating device actuated by the shaft; a driven sprocket fixed on the shaft; a motor on the platform; a driving sprocket driven by the motor; a chain connecting the driving and driven sprockets; guide sheaves for each reach of the chain adjacent to the pivot of the boom, said sheaves being positioned relatively to the pivoted boom to retain an approximately constant tension on the chain as the boom is swung; and means for adjusting one of the sprockets to tension the chain in a direction relatively to the reaches of the chain to maintain equal tension at different positions of the boom.

5. In an excavating machine, the combination of a platform; a boom pivotally mounted on the platform; a shaft mounted on the boom; an excavating device actuated by the shaft; a driven sprocket fixed on the shaft; a motor on the platform; a driving sprocket driven by the motor; a chain connecting the driving and driven sprockets; guide sheaves for each reach of the chain adjacent to the pivot of the boom, said sheaves being positioned with a line connecting the axes of the sheaves crossing a line from the pivot of the boom to the axis of the driven sprocket; and means for adjusting one of the sheaves along the line of the reach between the sheave and the driving sprocket.

6. In an excavating machine, the combination of a platform; a boom pivotally mounted on the platform; a shaft mounted on the boom; an excavating device actuated by the shaft; a driven sprocket fixed on the shaft; a motor on the platform; a driving sprocket driven by the motor; a chain connecting the driving and driven sprockets; guide sheaves for each reach of the chain; a mounting for the sheaves adjacent to the pivot of the boom comprising a bracket in which one sheave is rotatively mounted; and an arm rotatively mounted on said bracket on which the other sheave is rotatively mounted, the pivot of the arm being positioned relatively to the reach to swing the sheave mounted thereon along the line of the reach of the chain leading from the sheave to the driven sprocket.

7. In an excavating machine, the combination of a platform; a boom pivotally mounted on the platform; a shaft mounted on the boom; an excavating device actuated by the shaft; a driven sprocket fixed on the shaft; a motor on the platform; a driving sprocket driven by the motor; a chain connecting the driving and driven sprockets; guide sheaves for each reach of the chain adjacent to the pivot of the boom; a mounting for the sheaves comprising a bracket; a sheave shaft carried by the bracket on which one of the sheaves is mounted; an arm pivotally mounted on said sheave shaft and on which the other of said sheaves is mounted, the arm extending in a direction to swing the sheave mounted thereon along the line of the reach between said sheave and the driven sprocket; and means for adjusting the arm.

In testimony whereof I have hereunto set my hand.

EDWIN J. ARMSTRONG.